United States Patent
Groth

(10) Patent No.: US 6,579,164 B1
(45) Date of Patent: Jun. 17, 2003

(54) METHOD FOR REMOVING SKIN FROM THE BODY AND/OR PARTS OF THE BODY OF ANIMALS, AND DEVICE THEREFOR

(75) Inventor: Peter Groth, Ratzeburg (DE)

(73) Assignee: Nordischer Mashinenbau Rud. Kaader GmbH + Co KG, Lubeck (DE)

( * ) Notice: Subject to any disclaimer, the term of this patent is extended or adjusted under 35 U.S.C. 154(b) by 0 days.

(21) Appl. No.: 10/030,316

(22) PCT Filed: Jul. 8, 2000

(86) PCT No.: PCT/EP00/06569
§ 371 (c)(1),
(2), (4) Date: Jan. 10, 2002

(87) PCT Pub. No.: WO01/03509
PCT Pub. Date: Jan. 18, 2001

(30) Foreign Application Priority Data

Jul. 12, 1999 (DE) .......................... 199 32 085
Aug. 5, 1999 (DE) .......................... 199 36 974

(51) Int. Cl.$^7$ ................................ A22B 5/16
(52) U.S. Cl. ............................. 452/125; 452/130
(58) Field of Search ................... 452/83, 85, 130, 452/125, 111

(56) References Cited

U.S. PATENT DOCUMENTS

| 3,729,775 A | * | 5/1973 | McDonald | .................. 452/130 |
| 4,378,613 A | | 4/1983 | Crouch | |
| 4,459,721 A | | 7/1984 | Hill | |
| 5,098,336 A | * | 3/1992 | DeLong | ...................... 452/111 |
| 5,167,569 A | * | 12/1992 | Davis | ......................... 452/130 |
| 5,186,680 A | | 2/1993 | Conaway et al. | |
| 5,637,038 A | * | 6/1997 | Davis | ......................... 452/111 |

FOREIGN PATENT DOCUMENTS

| EP | 2155757 | | 10/1985 | |
| EP | 441124 | | 8/1991 | |
| FR | 2627058 | * | 8/1989 | ................. 452/130 |

* cited by examiner

Primary Examiner—Peter M. Poon
Assistant Examiner—Joan M. Olszewski
(74) Attorney, Agent, or Firm—Mattingly, Stanger & Malur, P.C.

(57) ABSTRACT

The invention concerns a method for removing skin from the bodies of animals, preferably of fowls, and a device for implementing said method. Known devices comprise skin-removing rollers, designed to enable height adjustment via a control cam. Said devices, however, have the disadvantage of not enabling the rollers to be accurately positioned on the bodies of animals of different shapes, in particular on bodies with curves. The invention aims at supplying a device and a method ensuring optimal positioning enabling the skin to be removed without damage. This is achieved by the fact that the inventive device comprises skin-removing rollers with two degrees of freedom, thereby enabling said rollers to be optimally positioned, independently of the size of the animal body.

16 Claims, 10 Drawing Sheets

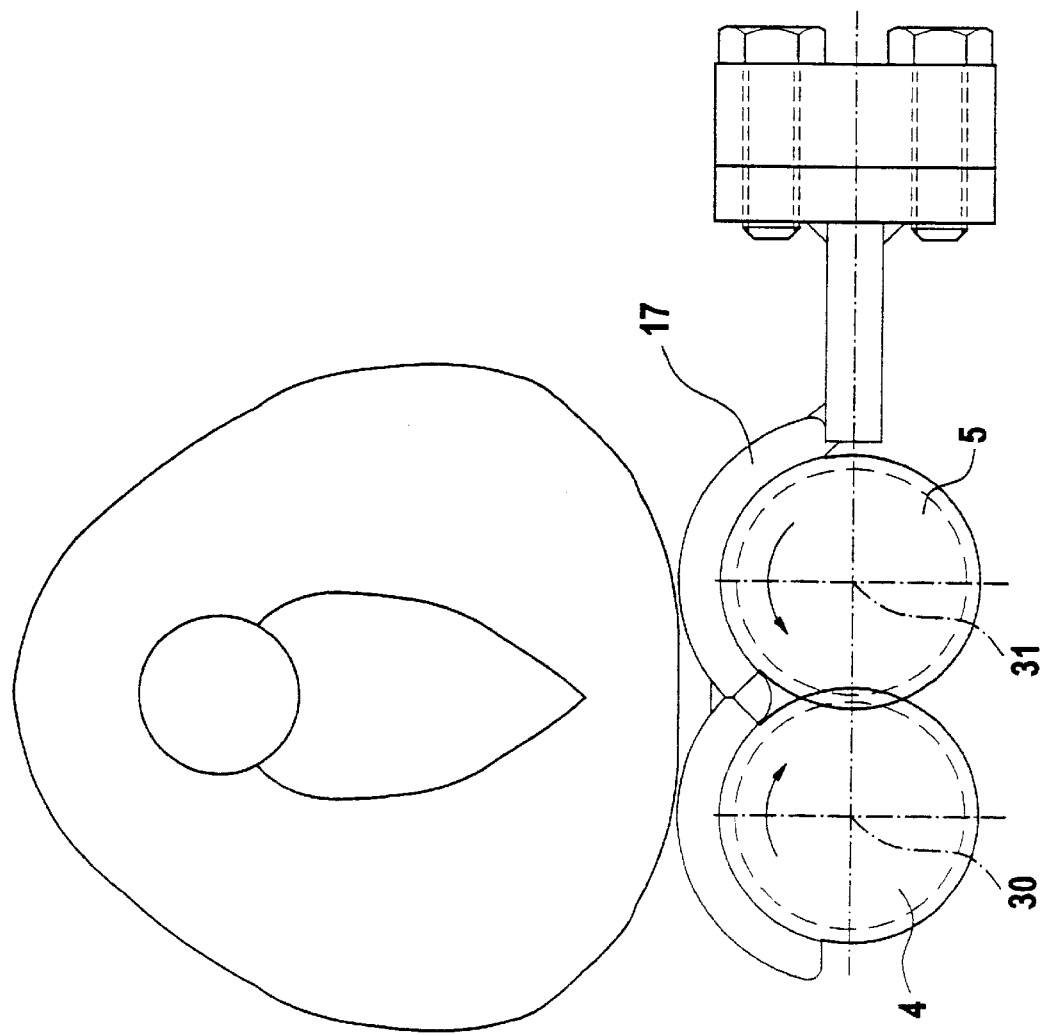

METHOD FOR REMOVING SKIN FROM THE BODY AND/OR PARTS OF THE BODY OF ANIMALS, AND DEVICE THEREFOR

The invention relates to a device for removing skin from animal carcasses and/or parts of animal carcasses, preferably poultry, movable rectilinearly relative thereto, comprising at least two skin-removing rollers arranged parallel to one another, extending substantially in the direction of motion and rotating counter to one another about correspondingly oriented axes of rotation, at least one roller drive for skin-removing rollers and a retainer for mounting the skin-removing rollers, the retainer being arranged height-adjustably in a height-adjustment plane in a processing machine, which plane is perpendicular to the plane subtended by the two axes of rotation of the rollers and is determined by the vector of the rectilinear motion. The invention further relates to a method for removing skin from animal carcasses and/or parts of animal carcasses.

Devices of the generic type serve for removing skin from animal carcasses and/or parts of animal carcasses, in particular for removing skin from poultry carcasses, the skin on entering the skin removing device usually being still almost completely arranged on the carcass. Thus, U.S. Pat. No. 4,459,721 discloses by way of example a skin removing device in which skin-removing rollers drivable in counter-rotating manner strip skin from animal carcasses, that is to say from poultry carcasses. The known device is constructed as a manual device and as such is integrable into an automated poultry processing machine only at very high cost or not at all. A substantial problem consists in that the complete detachment of the skin from usually curved poultry carcasses can ensue only by rotation or by tilting tracking of the poultry carcass over the skin-removing rollers but in an automated poultry processing machine having saddle conveyors which move in a straight line this is achievable only with difficulty or not at all. A further disadvantage consists in that the carrying away of the skin stripped from the animal carcass frequently results in problems due to the double-sided mounting of the skin-removing rollers since the stripped and separated skin can be caught, in the device and hence block the latter.

A further device for removing skin from animal carcasses or parts thereof is disclosed by DE 37 36 401. This device likewise has the disadvantage that exact positioning of the skin removing elements or skin-removing rollers on the animal carcass is only imprecisely possible. A further disadvantage consists in that the choice of the point of application of the skin-removing rollers on the animal carcass cannot be made freely. The rigid arrangement of the skin-removing rollers leads in particular in the case of curved animal carcasses to be processed to unsatisfactory skin removing results.

In known methods for the removing of skin from poultry carcasses in particular, the poultry carcasses are conveyed via the skin-removing rollers. The rollers grip the skin and pull it from the carcass whereby due to the fixed spacing and rigid position of the rollers, damage to the animal carcass and especially breast occurs. Furthermore, using the known method, only animal carcasses having very similar geometries can be processed, the point of application of the rollers on the animal carcass being determined by the predetermined position. This results in time-consuming and expensive retooling work in the processing of animal carcasses of different geometries.

Accordingly, the aim of the invention is to provide a device which allows automated removing of the skin from animal carcasses and/or parts of animal carcasses with exact positioning of the skin-removing rollers, this being independent of the size of the animal carcass. Another object of the present invention is to propose a method by which animal carcasses and/or parts of animal carcasses can be skinned automatically and independently of the size of the carcass in question without damage to the animal carcass and/or part of the animal carcass.

This task of automated removal of skin from animal carcasses or parts thereof is solved according to the invention in that the retainer of the skin-removing rollers possess an additional degree of freedom in such a way that they are pivotable about an axis which extends at right angles to the height-adjustment plane. By this means it is ensured that the skin-removing rollers can be positioned optimally on the animal carcass or on parts of the animal carcass, that is to say even at points which depend on the animal carcass can be located, for example, in the neck or belly region. Due to the fact that the skin-removing rollers can be moved with two degrees of freedom individual adaptation to the animal carcass to be processed is possible independently of its size and automated production inside a processing machine can be easily achieved since the animal carcasses continue to be transported on a saddle in a straight line through the skin removing device whilst the removing of skin takes place via the skin-removing rollers "travelling" over the contour of the animal carcass. In particular the pivoting motion allows tracking of the skin-removing rollers so that even at regions of the animal carcass which are trailing in the direction of transport the skin removing rollers can grip the animal carcass and/or parts of the animal carcass.

In a preferred embodiment of the device according to the invention the retainer is constructed to be elastically deflectable in such a way that the skin-removing rollers are automatically adjustable to animal carcasses and or parts of animal carcasses of different size. By this means it is possible in surprisingly simple manner to achieve an optimum skin removing position and hence an improved skin removing result since the animal carcass and/or parts of the animal carcass themselves control the movement of the skin-removing rollers. The elastic arrangement ensures, furthermore, that animal carcasses of different size can be processed one after another without the expense of retooling.

A further preferred embodiment of the invention possesses skin-removing rollers which are provided with a control mechanism which allows lifting off, what is known as controlled lift-off, of the skin-removing rollers from the poultry carcass so that contact between the skin-removing rollers and animal carcass occurs only at those positions at which contact is actually desired.

Advantageously, the skin-removing rollers are mounted only on one side, that is to say over-mounted in the retainer in an inlet region for feeding animal carcasses into the skin removing device. This ensures simple carrying away of the separated skin in an outlet region since the free ends of the skin-removing rollers allow trouble-free stripping off. A further advantage consists in that the skin-removing rollers are readily accessible for maintenance purposes or the like by way of example.

Furthermore, the task underlying the invention is solved by a method having the following steps:

transportation of the animal carcasses and/or parts of animal carcasses, the animal carcasses and/or parts of animal carcasses running up onto a ramp member for recording their position;

alignment of skin-removing rollers by pivoting about an axis (32) by the animal carcass itself in accordance with the recorded position and the size of the animal carcasses and/or parts of animal carcasses;

seizure of the skin by the skin-removing rollers with subsequent controlled lift-off of the skin-removing rollers from the animal carcass and/or parts of animal carcasses, wherein the skin-removing rollers pivot about an axis which runs orthogonally to the height-adjustment plane of the rollers so that they can grip at the point on the animal carcass and/or parts of animal carcasses;

stripping off of the skin by transportation over the skin-removing rollers and simultaneous counter-rotation of the skin-removing rollers;

running of the animal carcasses and/or parts of animal carcasses of skin thereof onto a cover by means of which the skin is torn off completely and stripped from the skin-removing rollers.

By means of the method according to the invention automated removing of skin from animal carcasses without damage is guaranteed since the skin-removing rollers are moved only to seize or grasp the skin on the animal carcass. Due to controlled lift-off immediately after seizure of the skin the meat/breast located under the skin is protected due to the distance from the skin-removing rollers.

Further preferred embodiments of the invention emerge from the subsidiary claims and the description. A preferred embodiment of the invention is explained in more detail with reference to the drawing. This shows:

FIG. 7 is a side elevation view according to FIG. 6;

Figure 1:
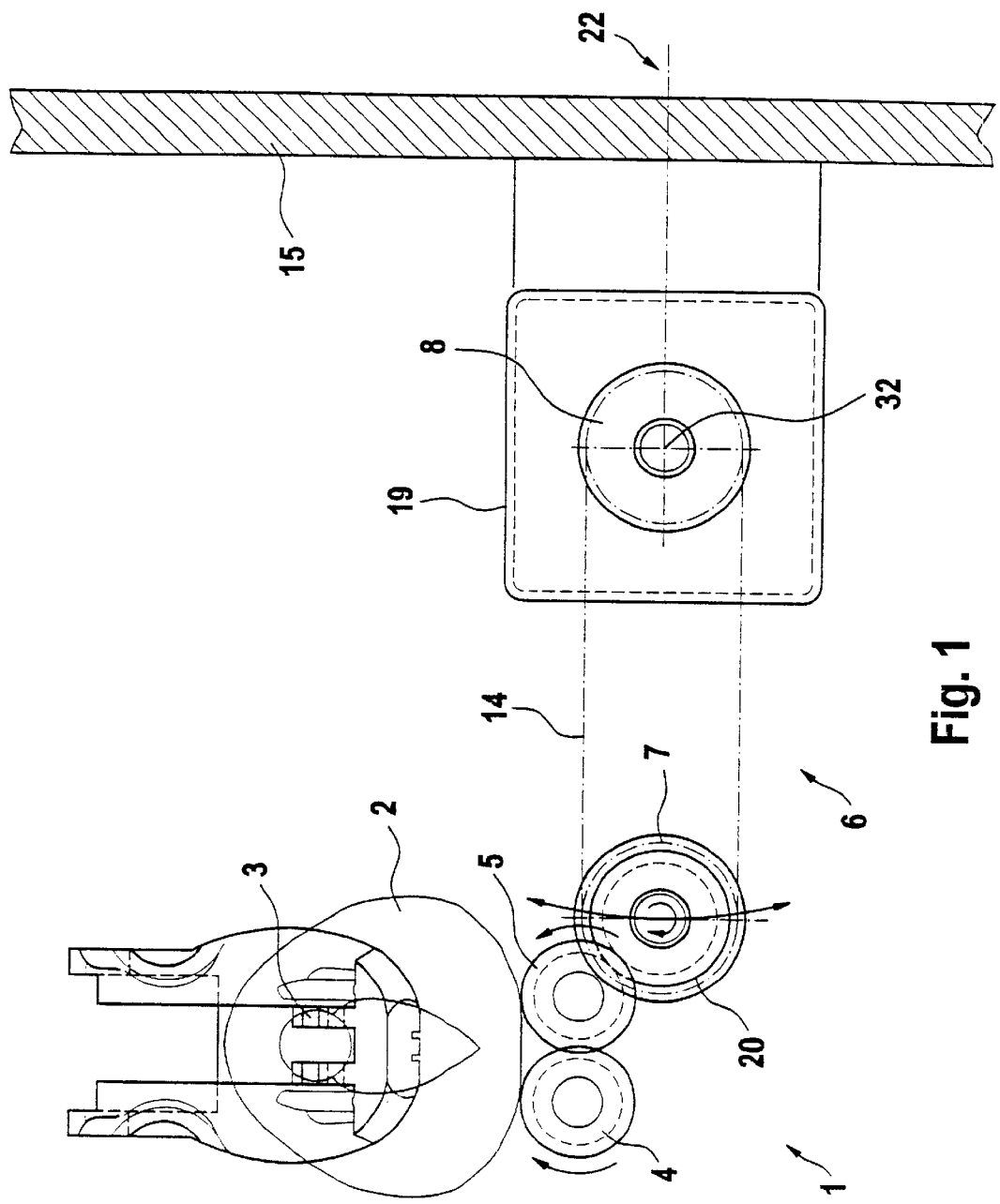
FIG. 1 is a schematic illustration of a device for removing skin from a carcass.

The exemplified embodiment schematically illustrated in FIG. 1 shows a poultry processing machine 15 having a device 1 for removing skin from poultry carcasses 2. The poultry carcass 2 is retainered on a clamping saddle 3 and in the embodiment shown is located in the intake region of skin-removing rollers 4 and 5. The skin-removing rollers 4, 5 are driven by a chain drive 6 in association with a chain wheel 7 and the driving pinion 8, the chain wheel 7 and the driving pinion 8 being connected to one another via a chain 14 and being in operative engagement. The transmission of the drive power, that is to say the rotation on the drive shaft of a drive 19, to the skin-removing rollers 4, 5 ensues via a skin removing roller driving pinion 20 which is arranged obliquely beneath the skin removing roller 5 and is in operative engagement or meshes with the latter.

The elements of the device 1 for removing skin from poultry carcasses already described are arranged inside a housing of the poultry processing machine 15, it being the case, for example, that the poultry processing machine 15 can be a filleting machine. Such poultry filleting machines usually possess an endless conveyor which allows the achievement of continuous and automated processing of animal carcasses.

The skin-removing roller 4 and 5 are mounted in the region of a retainer 18 which is constructed as a long rocking arm. Inside the retainer 18 the skin-removing rollers 4 and 5 are mounted on only one side. Due to the over-mounting of the skin-removing rollers 4 and 5 the ends of the skin-removing rollers 4 and 5 opposite the mounting form as it were free ends. The retainer 18 is of height-adjustable construction. The height adjustment is effected in a height-adjustment plane which is located perpendicularly to the plane subtended by the two axes of rotation 30 and 31 [sic] of the rollers and is determined by the vector of the rectilinear motion, that is to say the direction of transport. The pivoting ensues about an axis of rotation 32 of the drive 19, the axis of rotation 32 being arranged parallel to the axes of rotation 30 and 31 of the rollers 4, 5. In other words the retainer 18 is arranged pivotably on the roller drive 19 for purposes of height adjustment in such a way that the retainer 18 and hence the skin-removing rollers 4 and 5 is movable up and down on a circular arc path, that is to say essentially perpendicularly to the plane subtended by the axes of rotation 30, 31 of the rollers 4, 5 (see FIG. 1).

Figure 2:
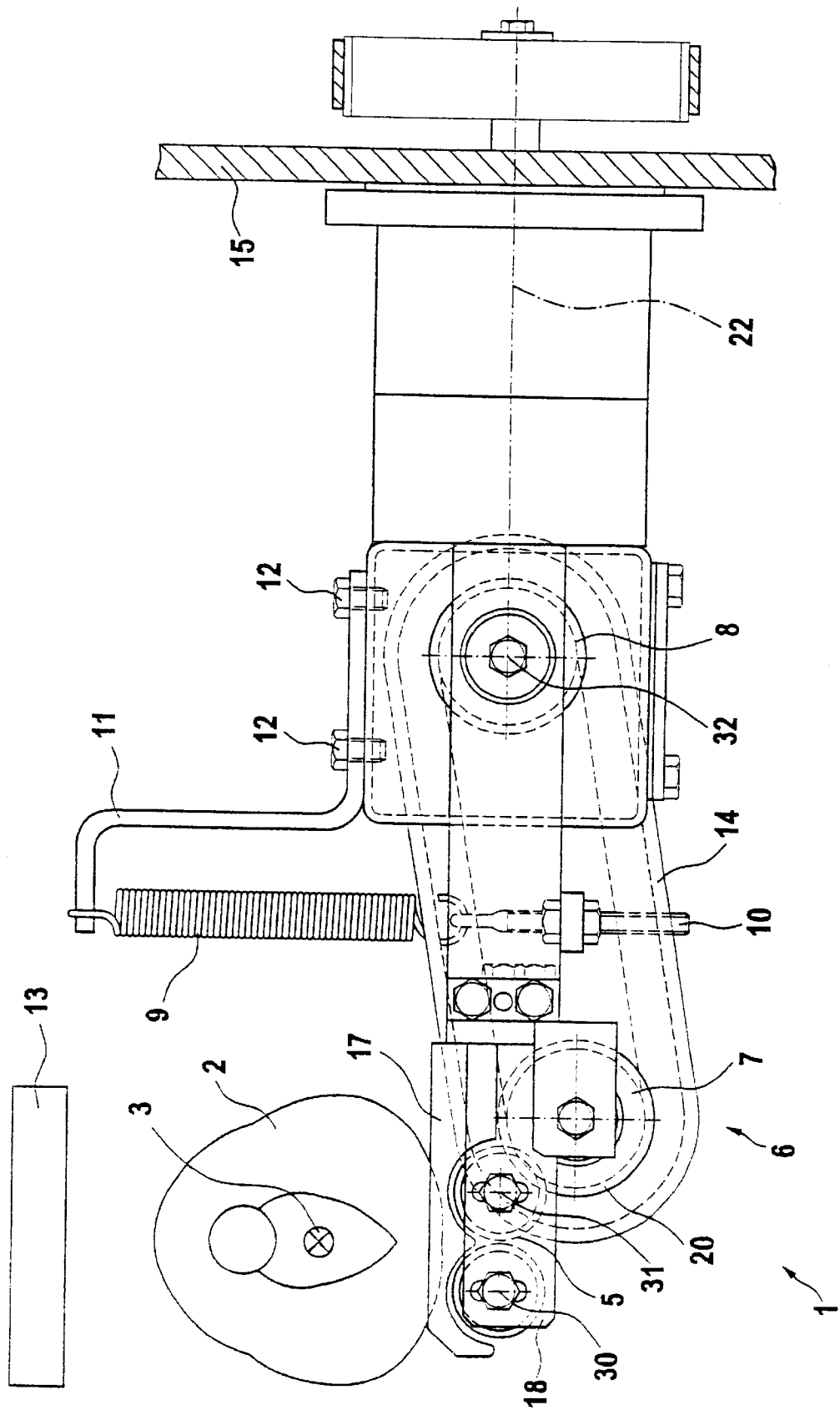
FIG. 2 is a detailed illustration of the device according to FIG. 1.

In FIG. 2 it may be seen that the retainer 18 is fastened by means of an oscillating spring 9 with screws 12 in fixed but detachable manner to the housing of the drive 19. The oscillating spring or tension spring 9 is in operative engagement with an oscillating spring adjustment screw 10 and an oscillating spring abutment 11 communicating therewith. The spring tension ensures that the retainer 18, in a state in which no animal carcass 2 is in the region of the skin removing device, is arranged in what is known as an upper starting state. The retainer 18 is deflected downwards by the poultry carcass 2 arranged on the clamping saddle 3 in an intake region of the skin-removing rollers 4 and 5, namely in accordance with the size of the poultry carcass. This elastic springing action has the advantage that a poultry carcass 2 moved in the upward direction of the saddle shifts the entire device 1 for removing skin from the poultry carcasses down below itself and the skin-removing rollers 4 and 5 are consequently conveyed into a suitable skin removing position. The clamping saddle plate 13 to which the clamping saddle 3 is fastened and which for its part is fastened to an endlessly circulating chain conveyor is indicated only schematically above the clamping saddle 3 in FIG. 2.

The drive 19 of the skin removing device and hence the retainer 18 is arranged rotatably or pivotably about an axis 22 on the housing of the poultry processing machine 15 in such a way that the axis of the rotation 22 becomes the roller pivot for the skin-removing rollers 4, 5. By this means an additional degree of freedom for the skin-removing rollers 4 and 5 is provided. The spatial position of the skin-removing rollers 4 and 5 can be altered in such a way that they can carry out pivoting movements relative to their horizontal centre of gravity axis. These pivoting movements can usually ensue in an angular range of 0° to 45° with respect to the horizontal position. Such a change in position alters the location of engagement of the skin-removing rollers 4 and 5 on the animal carcass at which for the first time the skin on the animal carcass comes into the intake region of the skin-removing rollers 4 and 5. In the case of certain animal carcasses it is advantageous to pull in the skin as early as the neck region whereas for other animal carcasses it is more advantageous to grasp the skin in the region of the breast for example.

On their side situated upstream in the transport direction of the poultry carcasses 2, that is to say in an infeed region, the retainer 18 or the skin-removing rollers 4 and 5 possess a ramp member 16. The ramp member 16 constructed as a run-up metal sheet facilitates the "threading" of the poultry carcasses 2 into the region of the skin-removing rollers 4 and 5 and at the same time records the position of the animal carcass to be skinned. The introduction or feed of the poultry carcasses 2 into the region of the device 1 for removing skin from the animal carcasses can be facilitated by a position of the skin-removing rollers 4 and 5 arranged at an inclination to the transport direction (see FIG. 4). By means of the ramp member 16 the exact position of the animal or poultry carcass can be recorded since the animal carcass itself controls the movement of the skin-removing rollers 4 and 5 for gripping the skin. During transport of the poultry carcasses 2 over the skin-removing rollers 4 and 5 which have an oblique toothed structure, the skin is caught in a pinch and finally severed completely by a cover 17 (described later). Due to the skin removing operation, the skin is perforated, squeezed and shredded.

For the purposes of further improving the results of removing skin from the carcass by damage-free detachment of the skin from the carcass it is provided that immediately after establishing contact with the poultry skin on the ramp member 16, the retainer 18 together with the skin-removing rollers 4 and 5 is moved away from the poultry carcass 2 in order to prevent damage to the breast meat. This movement vertically downwards, that is parallel to the height-adjustment plane, can take place for example by forcible controlled lift-off and movement away by means of cam. This cam described in more detailed below is adjusted on the basis of morphological data in association with a certain range of poultry in such a way that the largest poultry carcass determines the point at which the retainer 18 is moved downwards. In addition to the mechanical means for the controlled lift-off of the skin-removing rollers 4, 5 from the animal carcass 2 program-controlled alternative can also be employed.

In a further development (not illustrated) it is provided that the dimensions of the poultry carcasses 2 are determined by means of measuring elements in order in this way acting in conjunction with the spatially movable retainer 18 to grip the poultry skin at a suitable point and to move the breast skinner away again from the poultry carcass immediately afterwards.

In order to ensure reliably that the skin is carried away by the skin-removing rollers 4 and 5 the cover 17 is arranged in the outlet region of the skin-removing rollers 4 and 5 located downstream in the transport direction, which cover strips the detached skin from the rollers 4 and 5. The one-sided mounting of the skin-removing rollers 4 and 5 in the retainer 18 facilitates carrying off of the skin and maintenance and upkeep or disassembly thereof.

Figure 3:
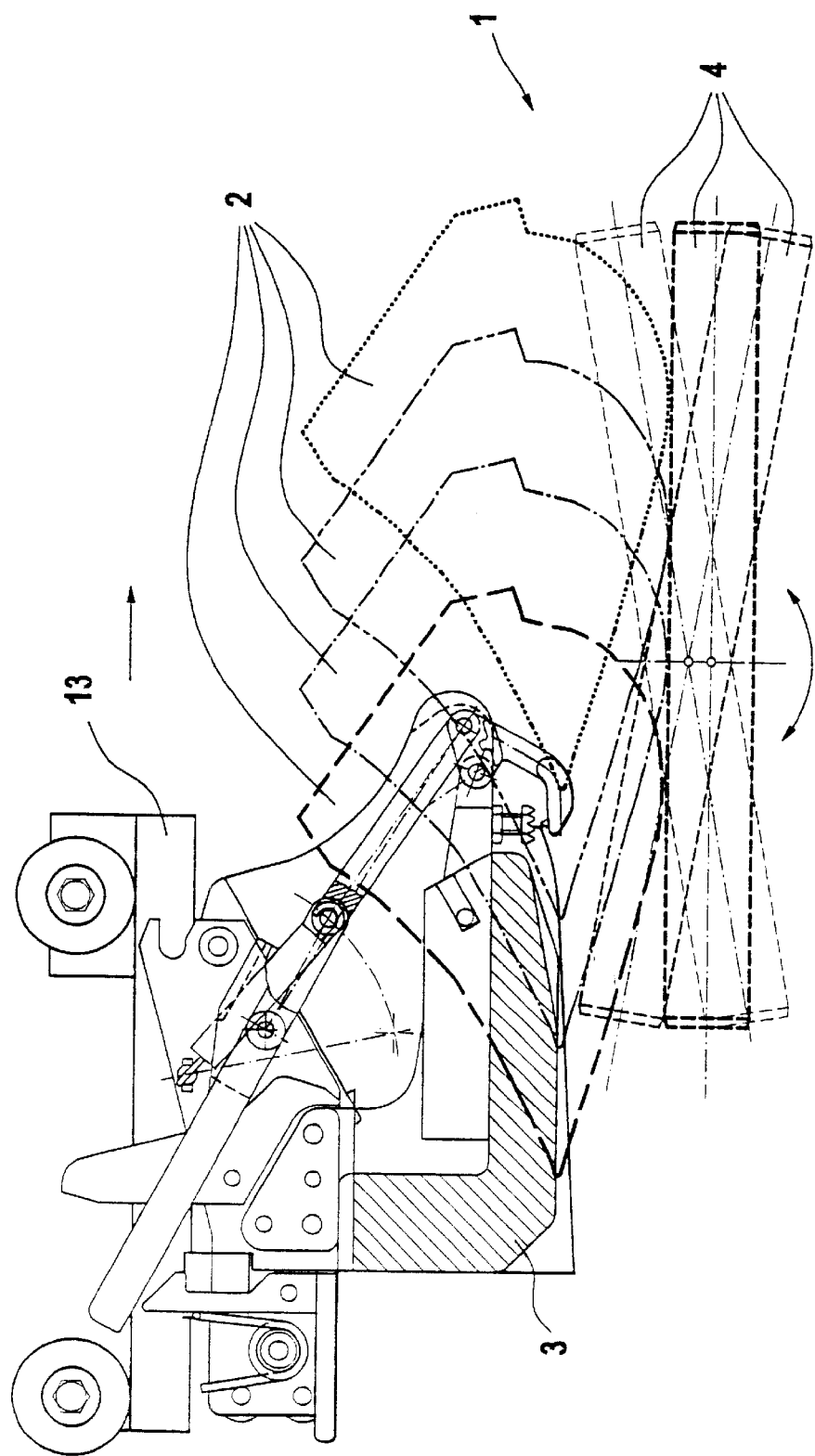
FIG. 3 is a front elevation view of the device according to FIG. 1 with an arrangement of the skin-removing rollers in multiple possible positions.

The operation of removing skin from poultry carcasses is described in more detail below. The poultry carcass 2 moves in a straight line, that is to say following the saddle conveyor, towards a pair of skin-removing rollers 4, 5. The pair of rollers 4, 5 is located centrally under the poultry carcass 2. Due to the ramp member 16 and the sloping position selected by preference for the rollers 4, 5 (see FIG. 3) poultry carcasses of different sizes can be skinned because due to the incline formed by the metal ramp late 16 a point of contact or grip on the surface of the poultry on the skin-removing rollers 4, 5 is always achieved. A large animal carcass 2 runs up onto the rollers 4, 5 earlier than a smaller animal carcass. The yielding of the skin-removing rollers 4, 5 to the force of the spring 9 ensures that the pressure from the skin-removing rollers 4, 5 on the animal carcasses 2 is not excessively high. The pressure can be selected by the controlled lift-off of the rollers 4, 5 from the animal carcass down in fact to complete removal of the rollers 4, 5 from the animal carcass 2. In other words the yielding movement of the skin-removing rollers 4, 5 downwards produced by the animal carcass 2 itself is supported and even overlaid by controlled lift-off so that the skin-removing rollers 4, 5 lift completely away from the animal carcass 2. Controlled lift-off occurs about the fulcrum or pivot of the retainer 18, that is to say about the axis 32.

In order to assist self-cleaning of the rollers 4, 5 and to prevent damage to the surface of the poultry, controlled lift-off ensures before contact with the cover 17 which is arranged in the region of the free ends of the rollers 4, 5.

In addition to the inclined position of the rollers 4, 5 it is also possible to swivel the rollers 4, 5 while the poultry carcass is carried past so that parts of the surface of the convex poultry carcass 2 trailing in the direction of transport are also reached. This removing of skin, also called tracking, adapts individually to the dimensions in question of the poultry carcass 2 and results in optimised and damage-free removing of skin.

Figure 4:
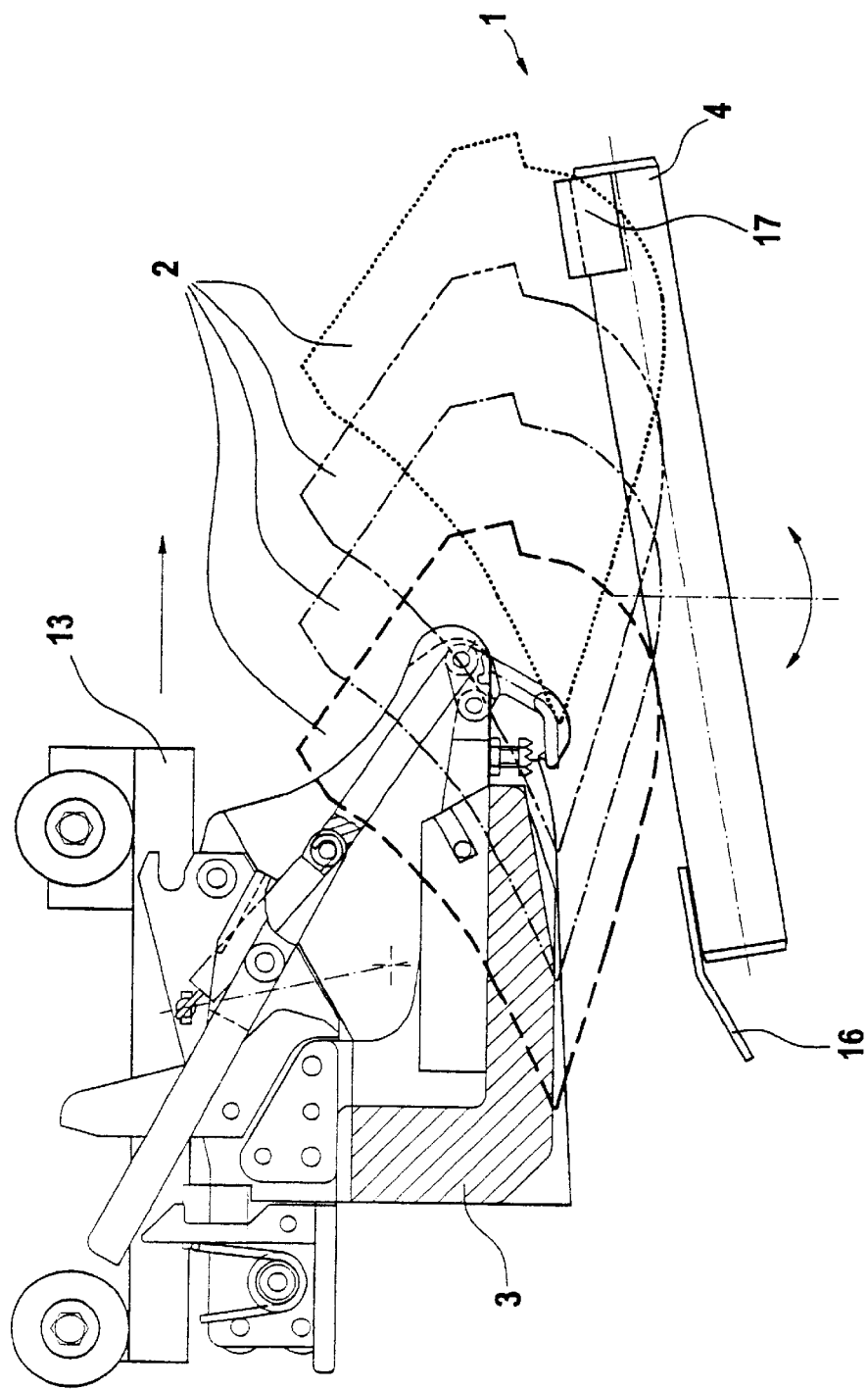
FIG. 4 is a front elevation view according to FIG. 3 illustrating a sheet metal ramp plate and cover.
Figure 5:
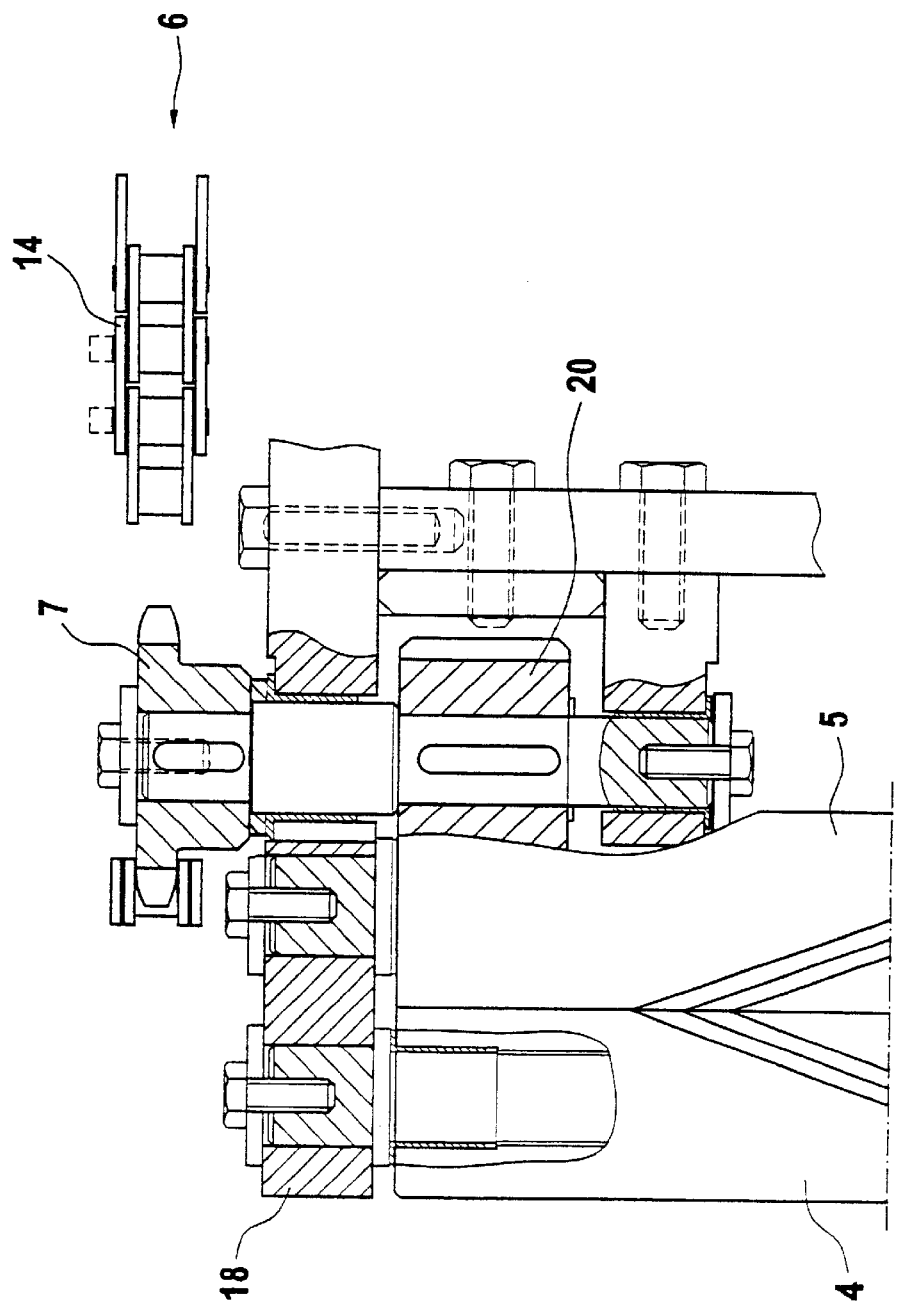
FIG. 5 is a section view through the drive region of the skin-removing rollers.
Figure 6:
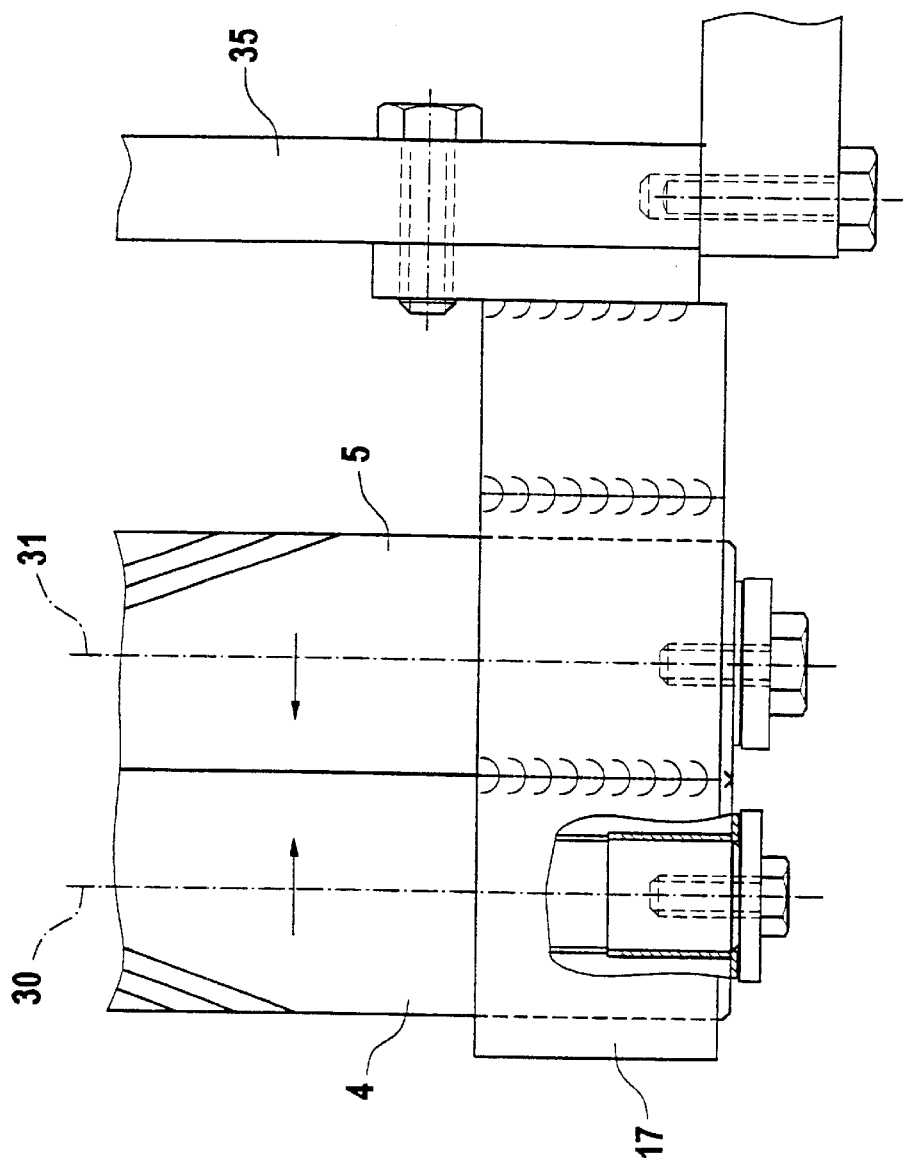
FIG. 6 is a detail view in the region of the cover.
Figure 8A:
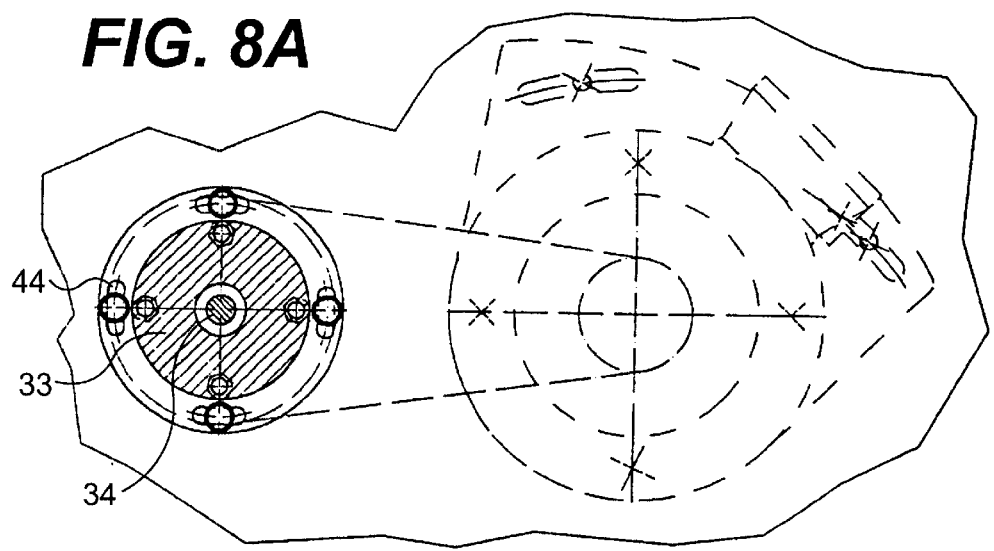
FIG. 8A is a view taken along line A–a of FIG. 8.
Figure 8:
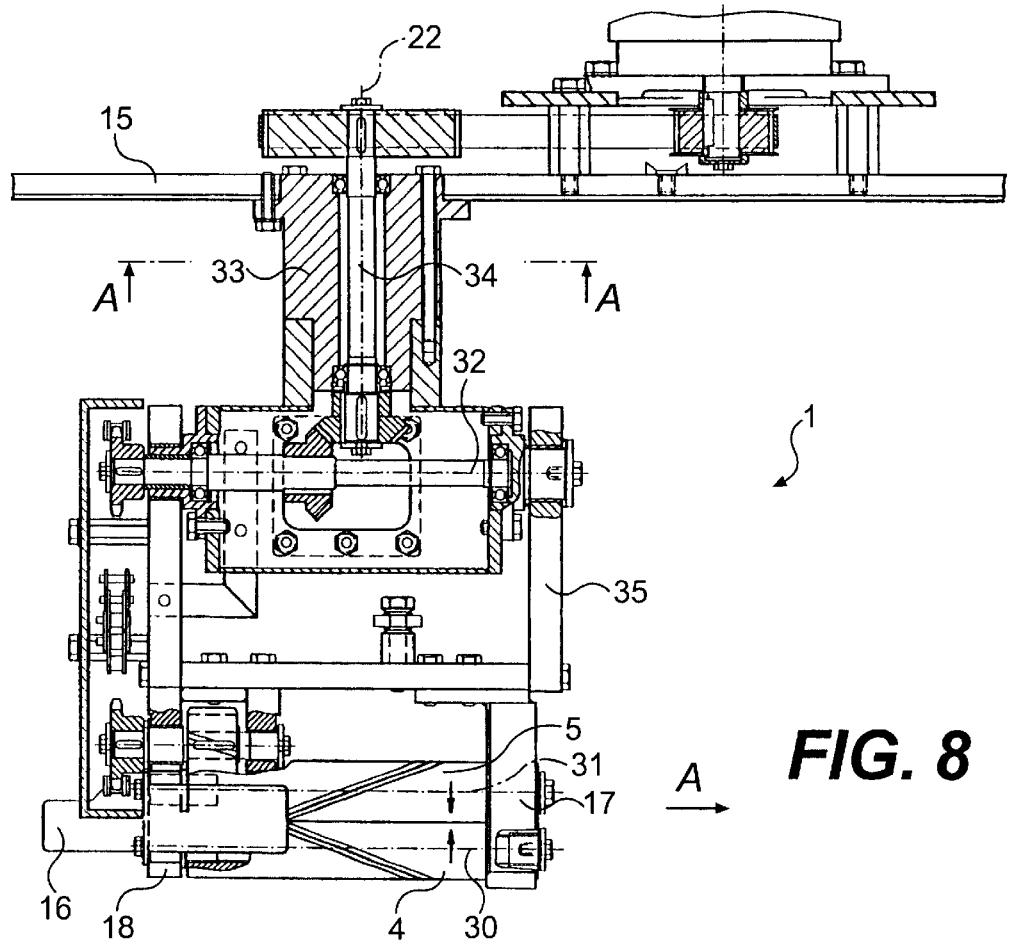
FIG. 8 is a plan view of the skin removing device illustrating a fixed pivot flange.
Figure 9:
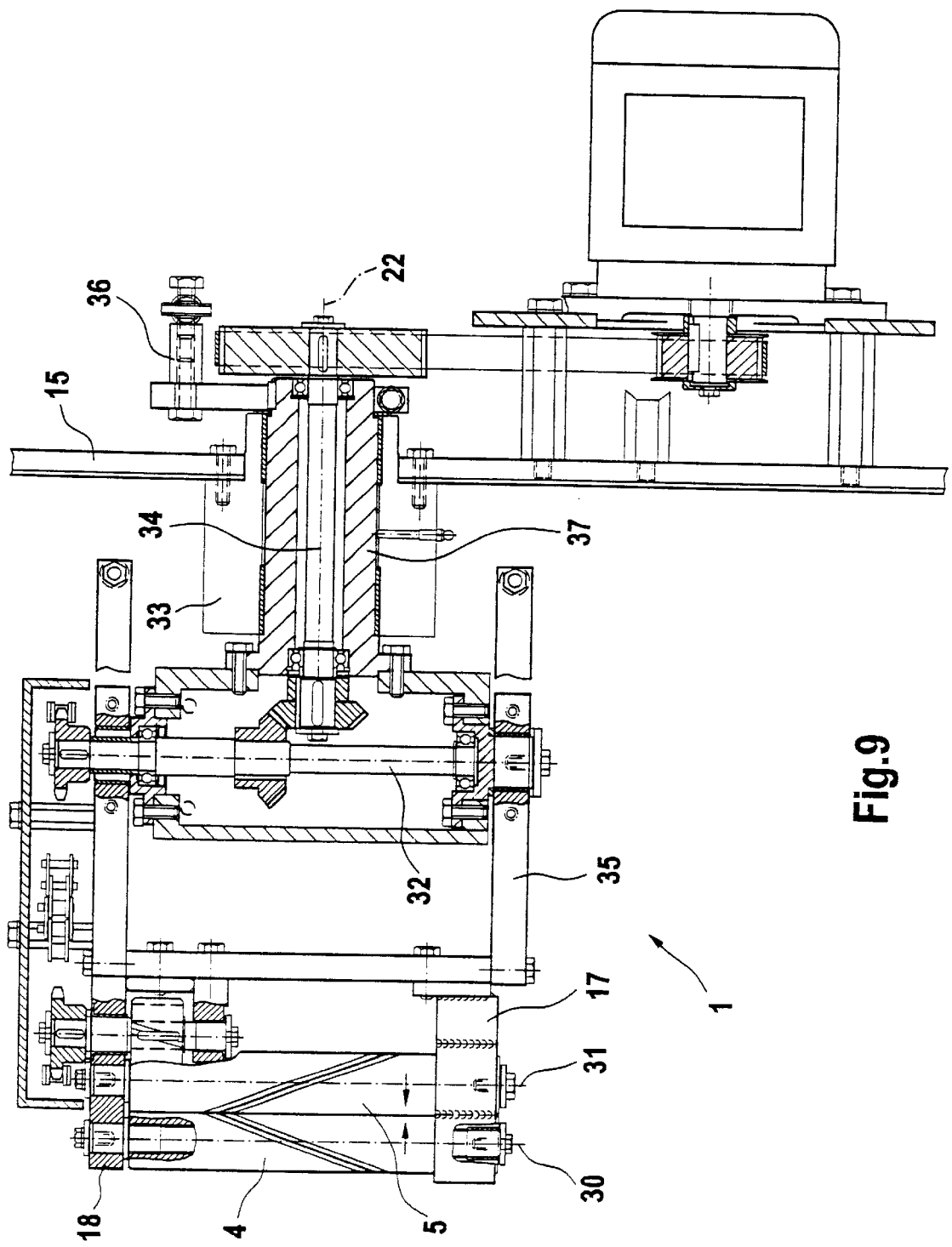
FIG. 9 is a plan view of the skin removing device illustrating a pivotable pivot flange.
Figure 10:
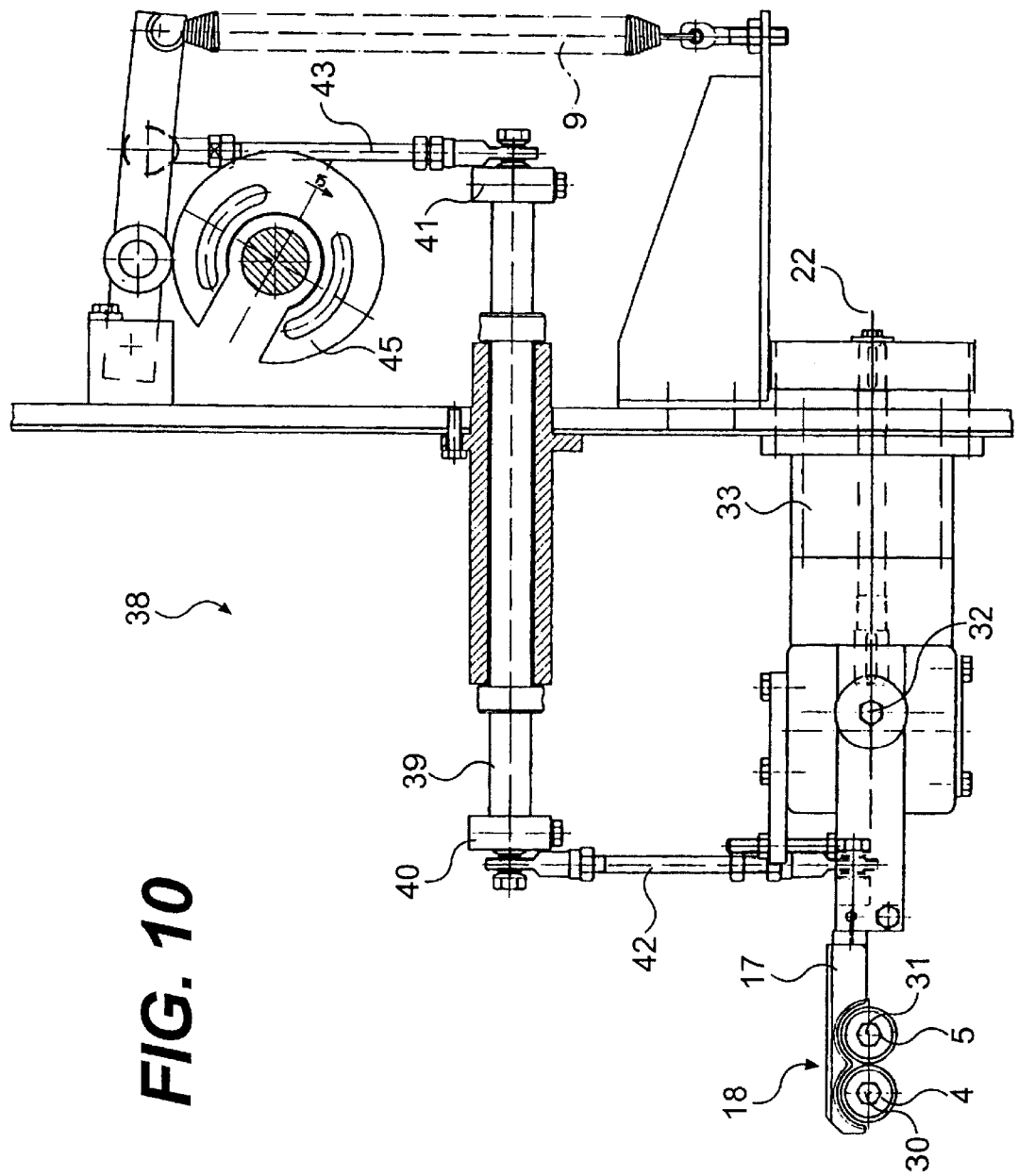
FIG. 10 is a front elevation view of parts of the skin removing device illustrating controlled lift-off means.

Further details on the sequences of movement and their mechanical transformations emerge from FIGS. 8 to 10. In FIG. 8 the device 1 is shown, the entire device 1 being arranged by a pivot flange 33 on the processing machine 15. Inside the pivot flange 33 the drive shaft 34 for driving the skin-removing rollers 4, 5 is arranged. The pivot flange 33 is fastened fixedly but detachably by bolts to the processing machine. In the embodiment according to FIG. 8 the flange 33 is fastened fixedly but adjustably. For adjusting the flange 33 the latter process oblong holes 44 which when the bolts are loosened allow pivoting of the entire device 1 including a frame 35 about the axis 22. By this means an angular position of the skin-removing rollers 4, 5 as shown in FIG. 4 is achievable. The pivot flange 33 is then fixed in this position. On the frame 35, in addition to the retainer 18 in the inlet region of device 1, the cover 17 is arranged in the outlet region. The frame 35 together with the retainer 18 is pivotable about the axis 32, as the result of which the skin-removing rollers 4, 5 are height-adjustable.

The same view of the device 1 according to FIG. 8 is shown in FIG. 9, wherein the pivot flange 33 is rotatably or pivotably arranged in the processing machine 15 in such a way that during processing of the animal carcasses the skin removing rollers 4, 5 can make a swivel movement about the axis 22. For realising the swivel movement the device has means, namely, a lever arm 36, which in the example shown are constructed as mechanical control means. The means 36 are operated via a control cam, whereby the movement of the control means 36 is transferred to an interior flange 37 arranged inside the pivot flange 33. The interior flange 37 itself is firmly connected to the entire device 1, so that the pivot movement, triggered by the means 36, is transferred directly to the frame 35 and thus to the skin removing rollers 4, 5.

FIG. 10 shows means, generally indicated by the numeral 38, for lifting off the skin removing rollers 4, 5 from the animal body 2. The mechanical means 38 are arranged above the device 1. The means 38 comprises essentially of a shaft 39 which has clamping levers 40, 41 at its two ends. The clamping levers 40, 41 extend parallel to the plane subtended by the rotary axes 30, 31. On the exposed ends of the clamping levers 40, 41 are provided in each case draw bars 42, 43 with articulated heads, running parallel to the height adjustment plane, which however extend in the opposite direction. The draw bar 43 is moved via a control cam 45 upwards or downwards parallel to the height adjusting plane. This leads by means of the clamping lever 41 to a rotary or swivel movement of the shaft 39. The rotary movement of the shaft 39 in turn leads to a translatory movement of the clamping lever 42 which finally causes the lifting off movement. Apart from the mechanical control means shown, other solutions such as for example programme-control can also be used.

What is claimed is:

1. Device for removing skin from an animal carcasses or parts of animal carcasses movable rectilinearly relative thereto, comprising at least two skin-removing rollers (4, 5) arranged parallel to one another, extending essentially in a direction of motion of the carcasses and rotating counter to one another about correspondingly oriented axes of rotation (30, 31), at least one roller drive (19) for the skin-removing rollers (4, 5) and a retainer (18) for mounting the skin-removing rollers (4, 5), the retainer (18) being arranged to be height-adjustable in a height-adjustment plane in a processing machine (15), which plane runs perpendicular to a plane subtended by the two axes of rotation of the rollers, characterized in that the retainer (18) or the skin-removing rollers (4, 5) possess an additional degree of freedom so that they are pivotable about an axis (22) which runs perpendicular to the height-adjustment plane.

2. Device according to claim 1, characterized in that the retainer (18) is arranged on a pivot flange (33) whereby the pivot flange (33) is arranged fixedly but adjustably on the processing machine (15).

3. Device according to claim 2, characterized in that the pivot flange (33) possess oblong holes so that it can be fixed in a pivot position.

4. Device according to claim 1, characterized in that the retainer (18) is fastened to an interior flange (37) which is arranged rotatably or pivotably on the processing machine (15).

5. Device according to claim 4, characterized in that the interior flange (37) is pivotable via mechanical control means (36).

6. Device according to claim 1, characterized in that for adjusting the height of the retainer (18), the retainer (18) is arranged pivotably on the roller drive (19).

7. Device according to claim 1, characterized in that the retainer (18) is constructed to be elastically yielding fashion so that the skin-removing rollers (4, 5) are automatically adjustable to different sized animal carcasses (2) or parts of animal carcasses.

8. Device according to claim 1, characterized in that the skin-removing rollers (4, 5) are pivotable about an axis (32) which is arranged parallel to the axes of rotation (30, 31) of the skin-removing rollers (4, 5).

9. Device according to claim 1, characterized in that the skin-removing rollers (4, 5) are each mounted at one end thereof on one side of the retainer (18).

10. Device according to claim 1, characterized in that a ramp member (16) is arranged in a region wherein the animal carcasses (2) or parts of animal carcasses run into removed skin from the device.

11. Device according to claim 1, characterized in that a region where the animal carcasses (2) or parts of animal carcasses run out of the skin removing device (1), a cover (17) is arranged.

12. Device according to claim 1, characterized in that it possesses means (38) for controlled lift-off of the skin-removing rollers (4, 5) from the animal carcass (2) or from parts of animal carcasses.

13. Device according to claim 12, characterized in that the means (38) for controlled lift-off are constructed mechanically.

14. Method for removing skin from animal carcasses or parts of animal carcasses comprising the following steps:

transportation of the animal carcasses (2) or parts of animal carcasses running up onto a ramp member (16) for recording their position;

alignment of skin-removing rollers (4, 5) by pivoting about an axis (32) by the animal carcass (2) itself in accordance with the recorded position and the size of the animal carcasses (2) or parts of animal carcasses;

seizure of the skin by the skin-removing rollers (4, 5) with subsequent controlled lift-off of the skin-removing rollers (4, 5) from the animal carcass (2) or parts of animal carcasses wherein the skin-removing rollers (4, 5) pivot about an axis (22) which runs orthogonally to a height-adjustment plane of the rollers (4, 5) so that the rollers can grip at any point on the animal carcasses (2) or parts of animal carcasses;

stripping off of the skin by transportation of the animal carcass (2) or parts of animal carcasses over the skin-removing rollers (4, 5) and simultaneous counter-rotation of the skin-removing rollers (4, 5); and running of the animal carcasses or parts of animal carcasses or skin thereof onto a cover (17) by means of which the skin is torn off completely and stripped from the skin-removing rollers (4, 5).

15. Method according to claim 14, characterized in that the skin-removing rollers (4, 5) are moved away immediately after seizure of the skin of the animal carcasses (2) to prevent damage to the animal carcasses (2) or parts of the animal carcasses.

16. Method according to claim 15, characterized in that the movement of the skin-removing rollers (4, 5) ensues via mechanical control means (38).

* * * * *

UNITED STATES PATENT AND TRADEMARK OFFICE
CERTIFICATE OF CORRECTION

PATENT NO.   : 6,579,164 B1
DATED        : June 17, 2003
INVENTOR(S)  : Peter Groth It is certified that error appears in the above-identified patent and that said Letters Patent is hereby corrected as shown below:

<u>Title page,</u>
Item [73], Assignee should read as follows:

-- [73]  Assignee: Nordischer Maschinenbau Rud. Baader GmbH + Co KG,
                   Lübeck (DE) --

Signed and Sealed this

Twenty-eighth Day of September, 2004

JON W. DUDAS
*Director of the United States Patent and Trademark Office*